May 18, 1943. J. G. STERLING 2,319,273
STENOGRAPHIC MACHINE
Filed Dec. 16, 1939 8 Sheets-Sheet 7
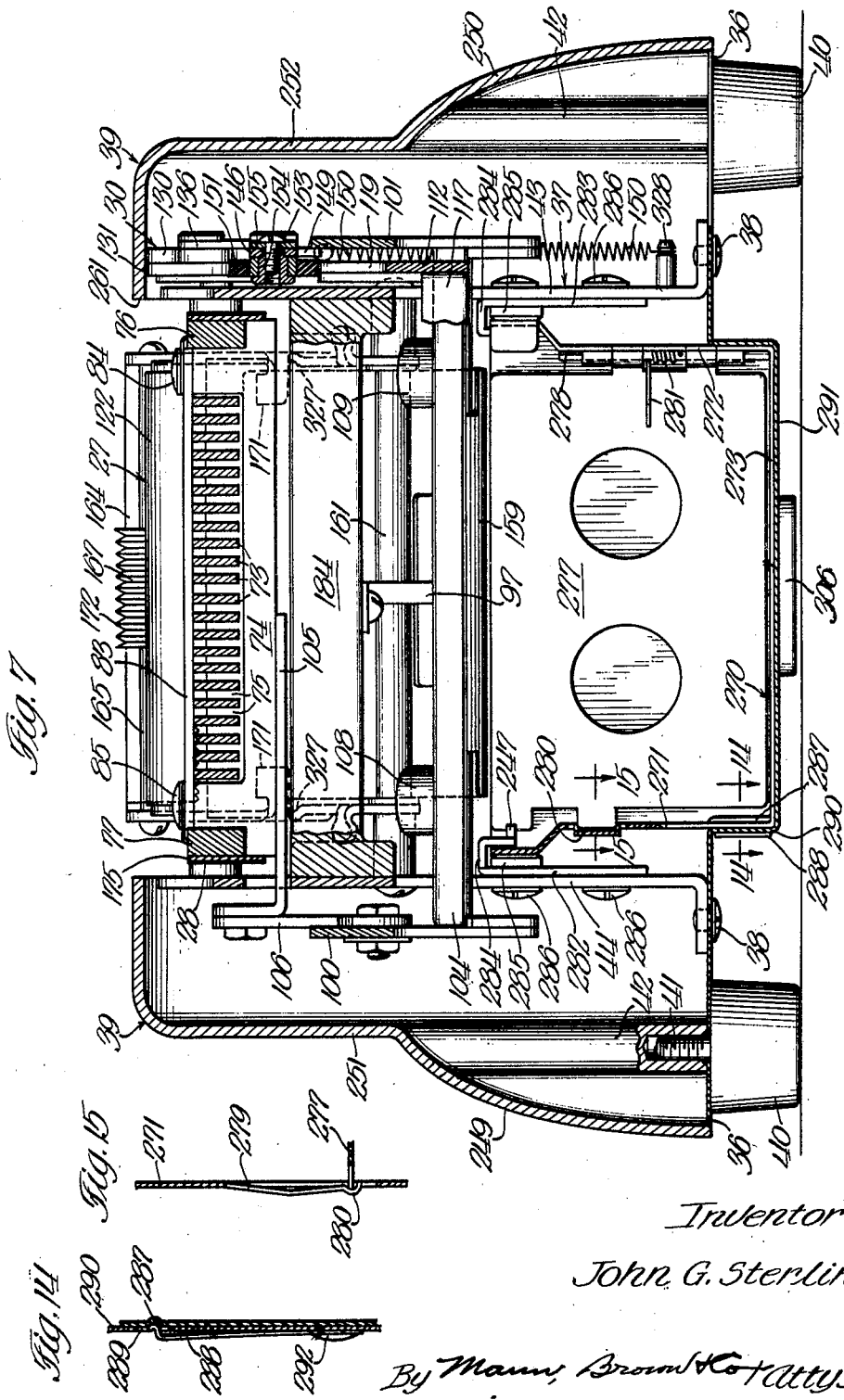
Inventor
John G. Sterling
By Mann, Brown & Co Attys.

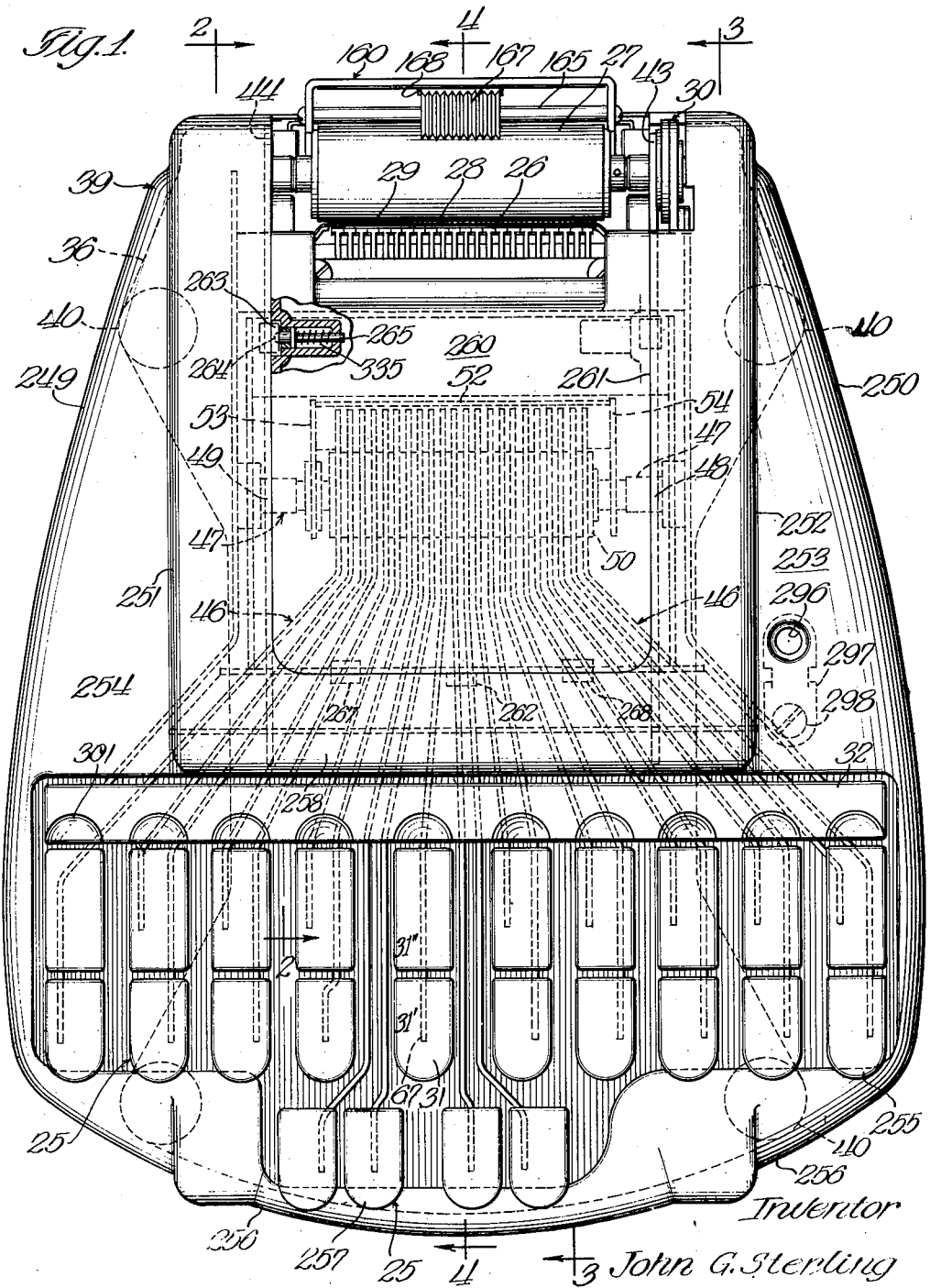

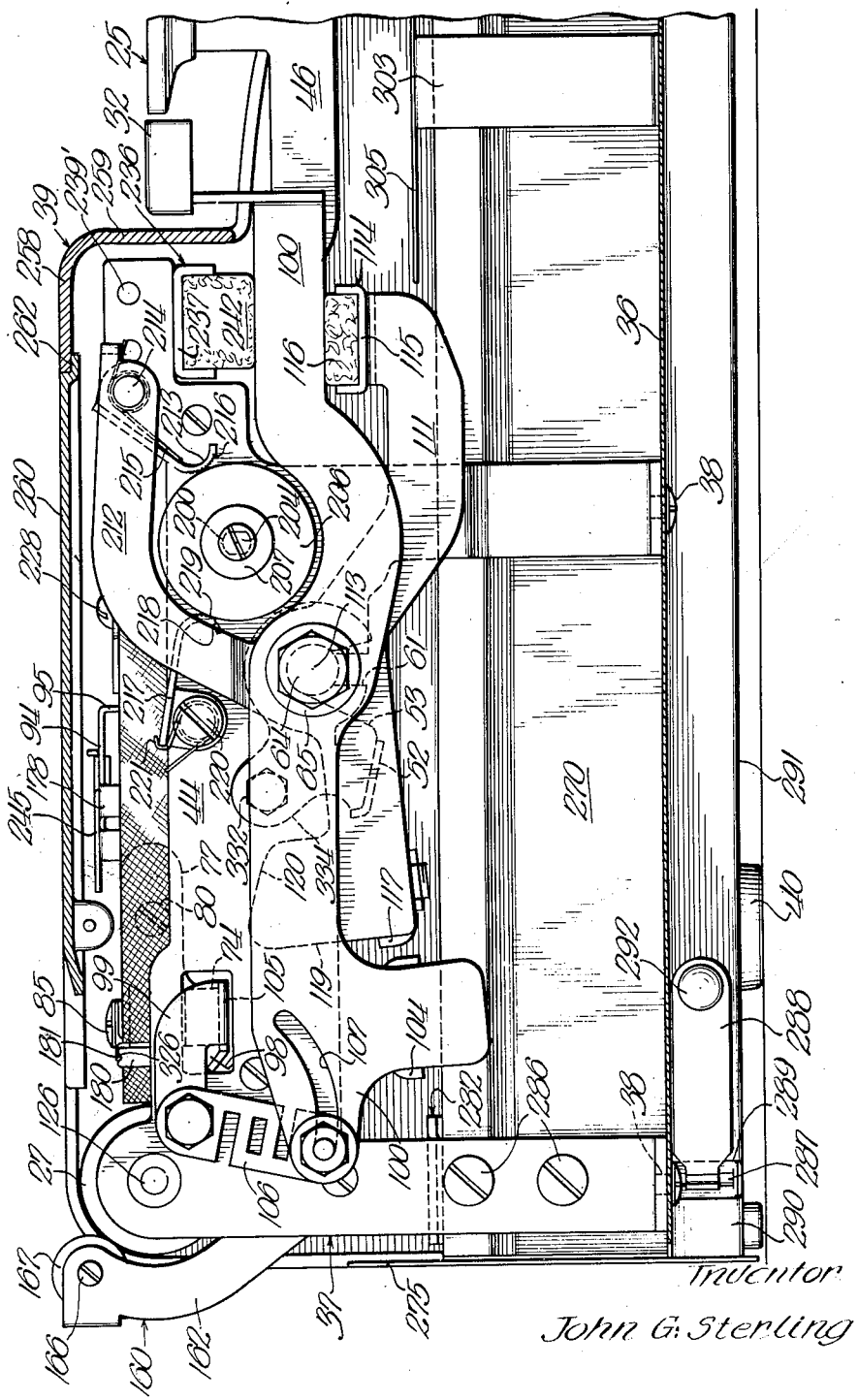

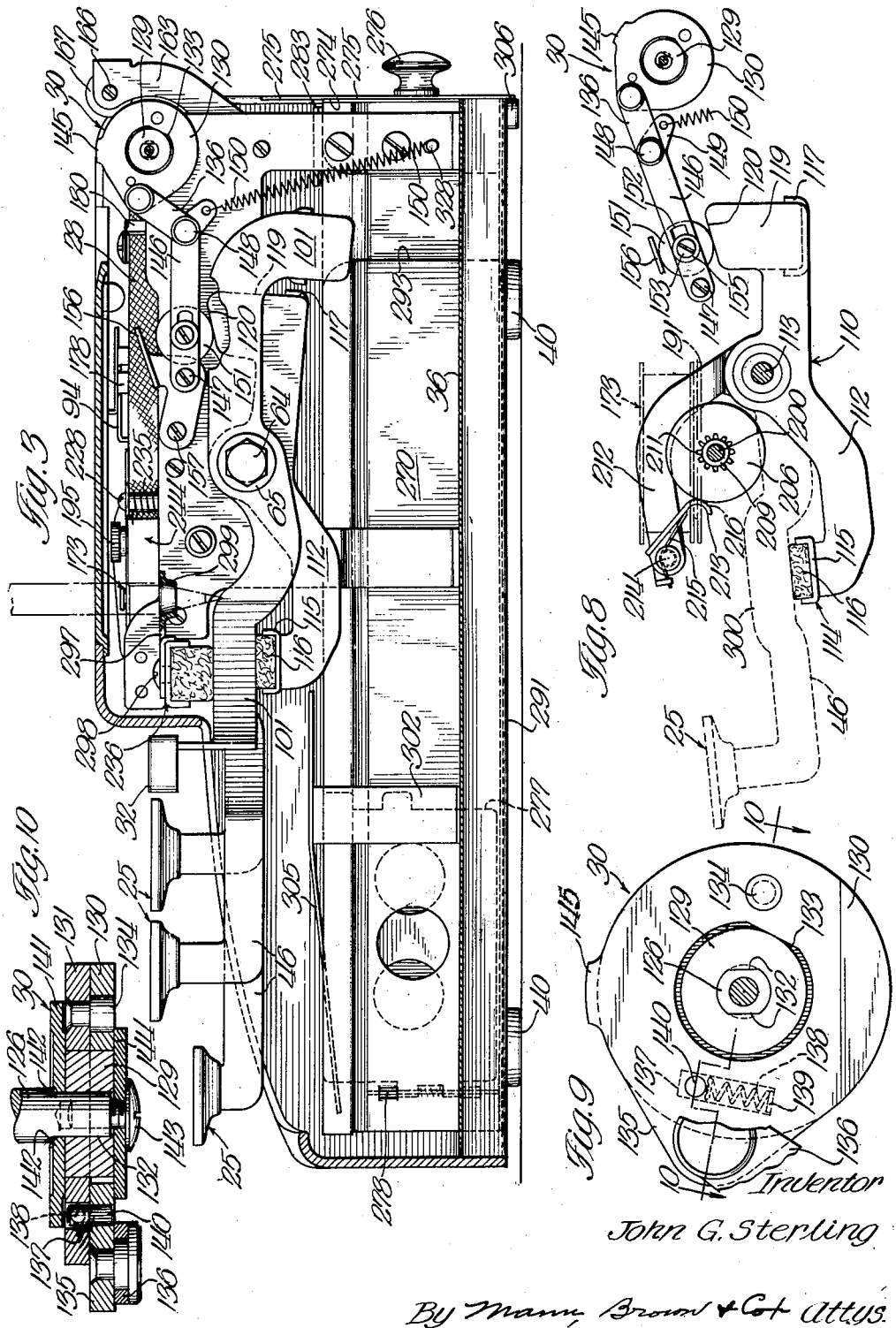

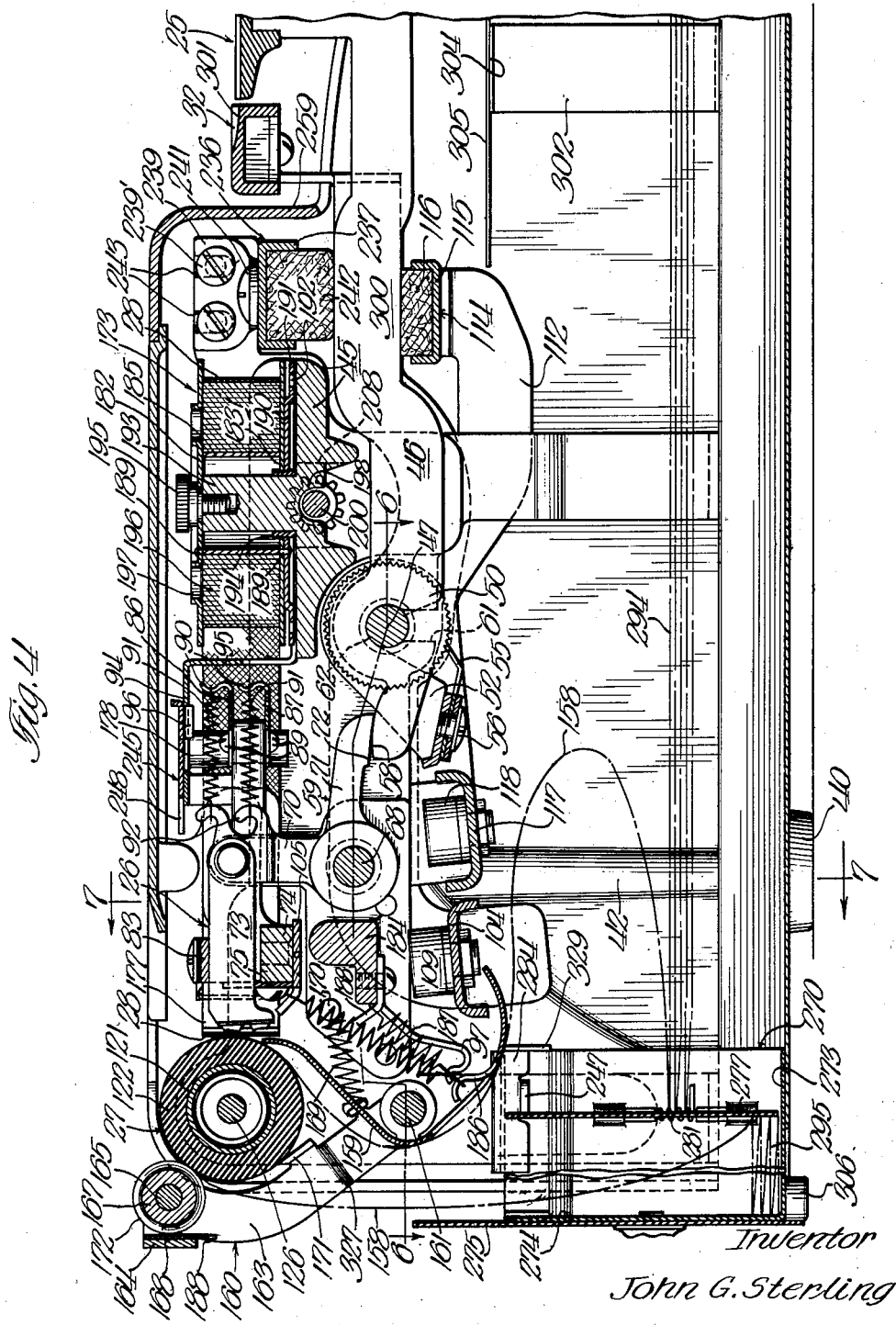

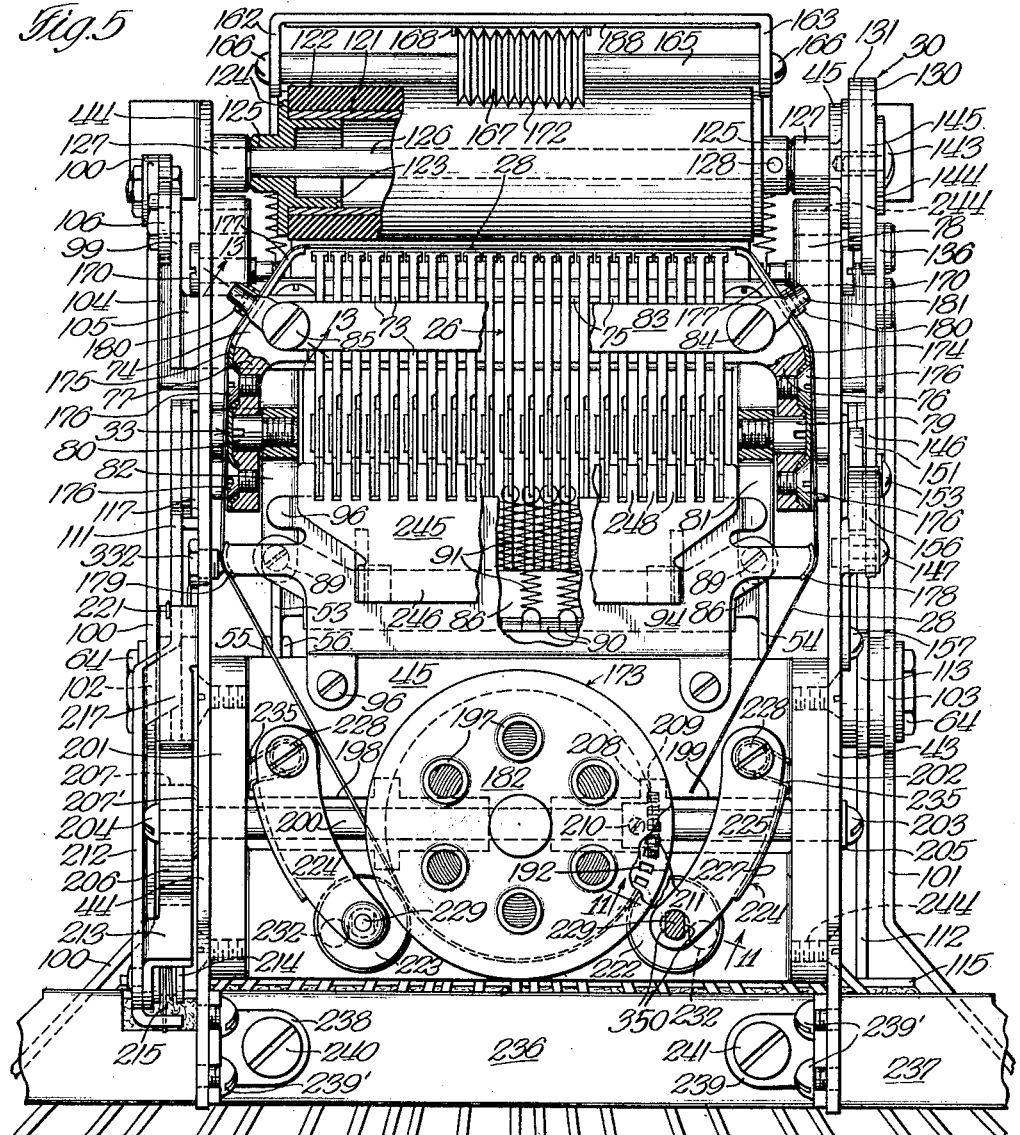

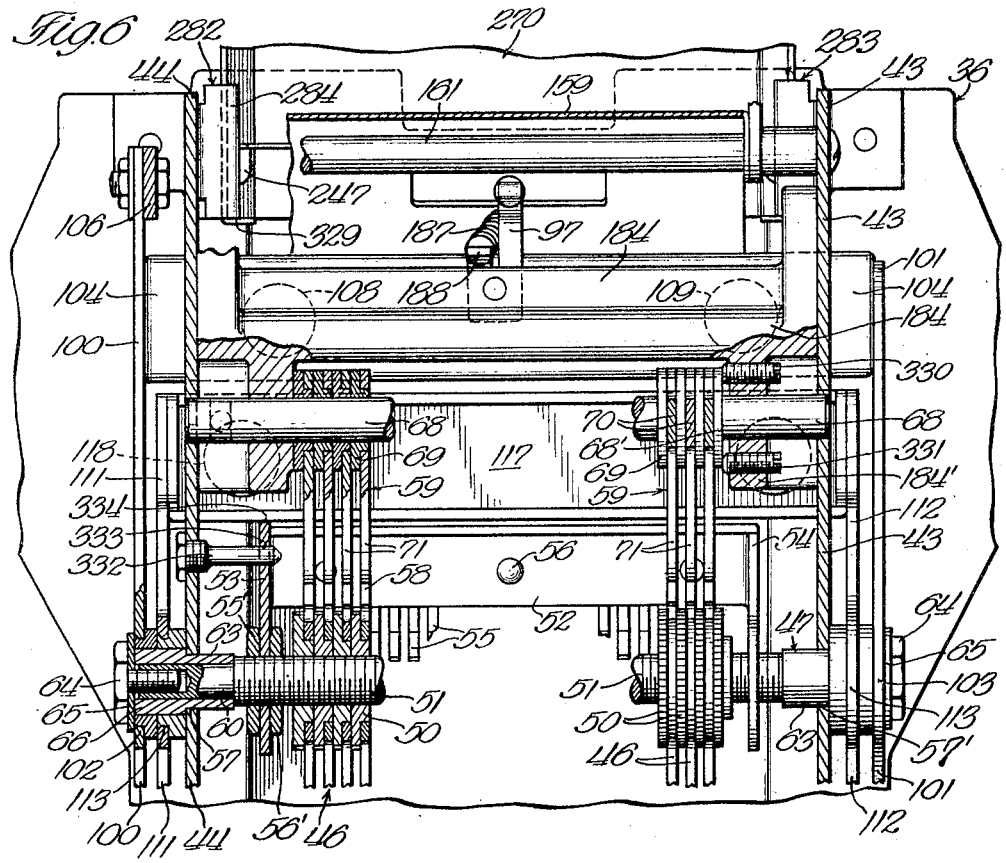
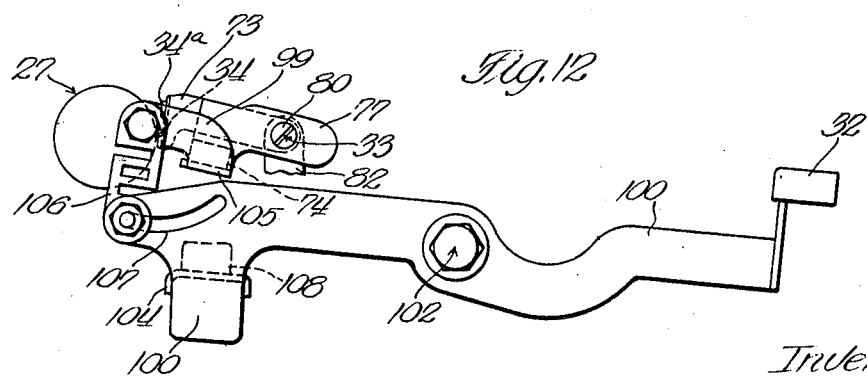

May 18, 1943. J. G. STERLING 2,319,273
STENOGRAPHIC MACHINE
Filed Dec. 16, 1939 8 Sheets-Sheet 8
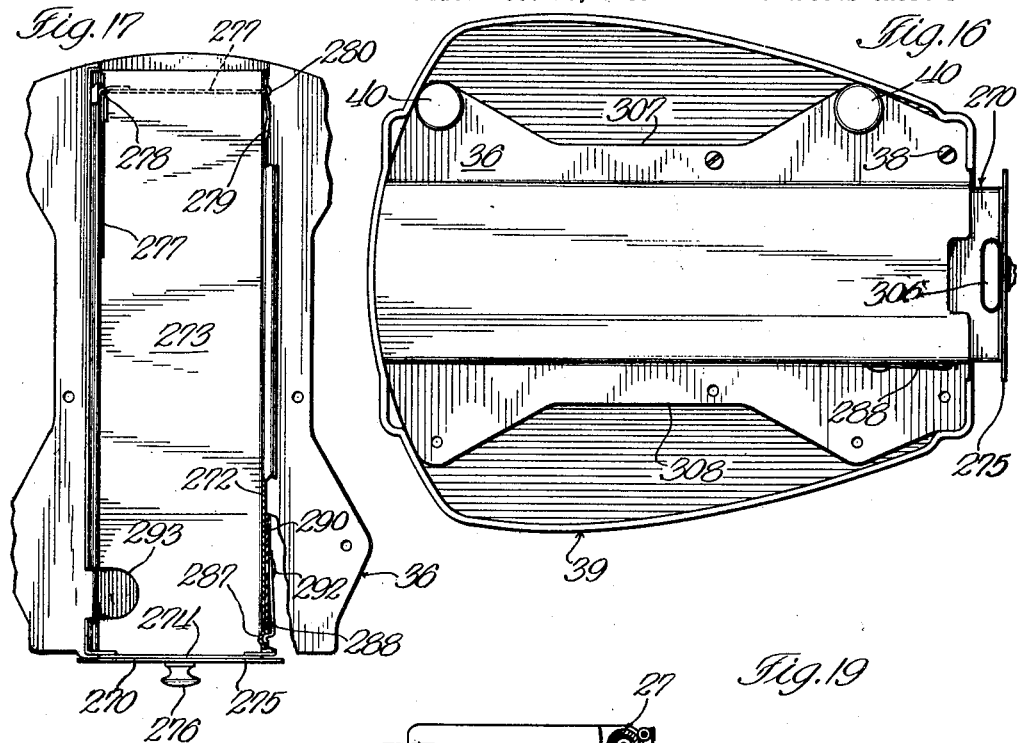
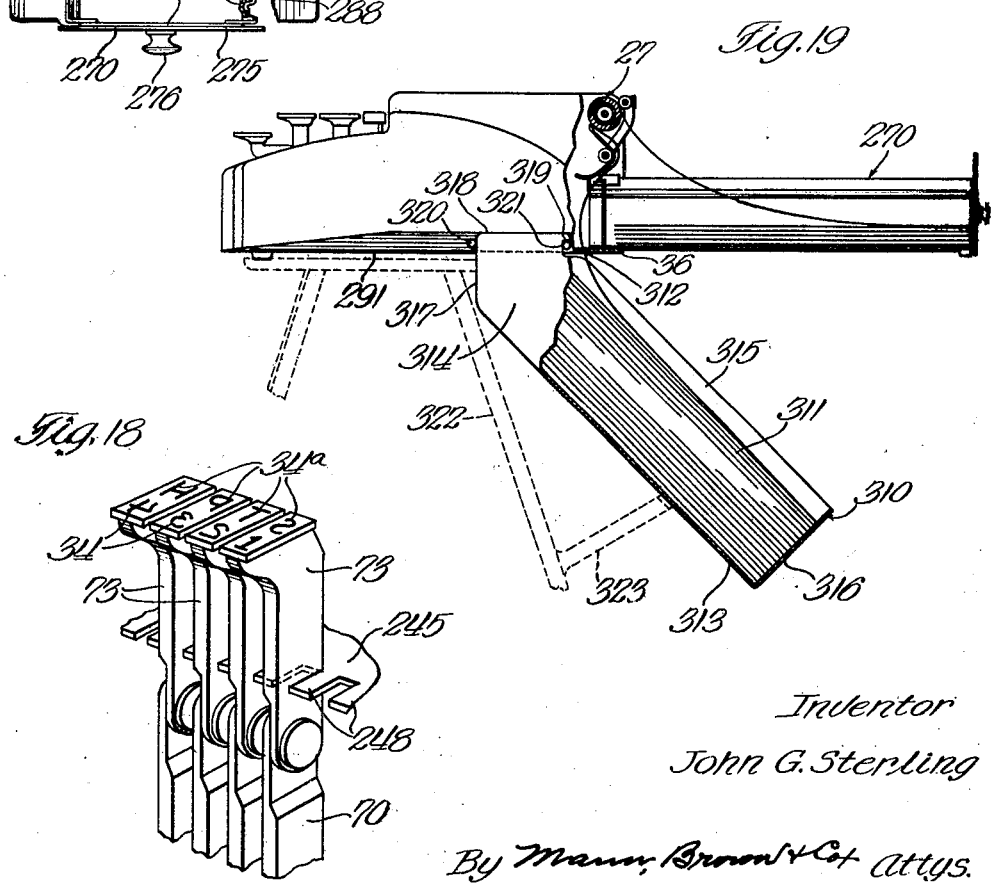
Inventor
John G. Sterling
By Mann, Brown & Co. Attys.

Patented May 18, 1943

2,319,273

UNITED STATES PATENT OFFICE 2,319,273

STENOGRAPHIC MACHINE

John G. Sterling, Chicago, Ill., assignor to Stenographic Machines Inc., a corporation of Illinois Application December 16, 1939, Serial No. 309,582

9 Claims. (Cl. 197—9)

This invention relates to stenographic machines of the type which is used to phonetically record the spoken word. Such machines are used in reporting conferences, court procedure, and the like, and in business offices for recording dictation.

The machines now commonly used have certain disadvantages which this invention seeks to avoid, and some of the more important objects of the invention, therefore, are as follows: To hold weight to a minimum by the use of light-weight materials and by a general simplification of the machine as a whole; to improve the appearance of the machine and make it easier to grasp in moving it from place to place; to reduce the overall dimensions of the machine, and at the same time increase its sturdiness and ability to retain adjustments even when the machine is handled roughly; to reduce manufacturing costs by organizing the elements of the machine into sub-assemblies, which greatly decrease the time and labor involved in assembling the machine and making factory adjustments; to facilitate maintenance of the machine by providing means for obtaining ready access to all parts thereof that may require adjustment or replacement; to provide a dependable clutch mechanism for feeding paper into the machine, which continuously gives silent operation and is readily adjustable to preserve the desired touch in the key action; to employ a ribbon mechanism that will provide uniform type impressions on the paper fed through the machine as long as the ribbon fabric remains undamaged and requires little or no attention over long periods of time; to use a ribbon in the ribbon mechanism that is substantially less expensive than the ribbons now commonly used in stenographic machines; to make the casing for the machine in such form that pencil notes can be made on the paper that has been fed through the machine, using the top surface of the casing for an impression surface; to improve the means for handling the paper fed into the machine and increase the paper carrying capacity of the machine; and to otherwise better the operation and usefulness of the machine.

The above constitute some of the principal objects and advantages of the present invention, others of which will become apparent from the drawings and a reading of the following description, in which Fig. 1 is a plan view of the machine fully assembled;

Fig. 2 is an enlarged side elevational view taken from the left-hand side of the machine taken on the line 2—2 of Fig. 1 with a portion of the front end of the machine broken away;

Fig. 3 is a side elevational view taken on line 3—3 of Fig. 1;

Fig. 4 is an enlarged vertical, longitudinal sectional view through the entire machine taken on line 4—4 of Fig. 1, a portion of the front of the machine being broken away;

Fig. 5 is an enlarged fragmentary plan view of the machine with the casing removed and showing particularly the ribbon, ribbon mechanism, type bars, and the relationship of these parts in the machine;

Fig. 6 is a horizontal sectional view through a portion of the machine taken on the line 6—6 of Fig. 4;

Fig. 7 is a vertical transverse sectional view through the rear portion of the machine taken on line 7—7 of Fig. 4;

Fig. 8 is a detail view of the universal bar frame, clutch, and ribbon mechanisms;

Fig. 9 is an enlarged detail view of the clutch;

Fig. 10 is a sectional view through the clutch taken on line 10—10 of Fig. 9;

Fig. 11 is an enlarged vertical sectional view through the ribbon feed pressure roller taken on the line 11—11 of Fig. 5;

Fig. 12 is a detail view of the numeral bar frame showing its fulcrum point and its connection with the type bars;

Fig. 13 is an enlarged vertical sectional view through the ribbon guide taken on the line 13—13 of Fig. 5;

Fig. 14 is an enlarged detail sectional view of the paper drawer catch taken on the line 14—14 of Fig. 7;

Fig. 15 is an enlarged detail sectional view of the paper gate closing catch taken on the line 15—15 of Fig. 7;

Fig. 16 is a bottom plan view of the machine showing the bottom plate together with a portion of the paper tray;

Fig. 17 is a top plan view of the paper tray showing the gate at the rear and portions of the tray broken away to show the gate fastening member and the stop preventing entire removal of the tray from the machine;

Fig. 18 is an enlarged fragmentary perspective view of the type supporting plate showing the type bars held in vertical position; and Fig. 19 is a side elevational view of the machine with a reporter's paper magazine supported below.

For the purpose of disclosing the present invention in compliance with section 4888 of the Revised Statutes, a specific embodiment of the invention has been selected, but obviously, many modifications may be made without departing from the present invention.

The many novel additions and improvements incorporated into a machine of this type are disclosed in the drawings and the following description, and the resulting machine is characterized by its sturdiness and compactness, silence and ease of operation dependability of action, modern and pleasing appearance, portability, its simplicity and construction and maintenance, and many other special features intended to improve the usefulness of the machine.

GENERAL ORGANIZATION

Referring to Fig. 1, the machine forming the subject matter of the present invention has a plurality of keys, generally indicated at 25, operatively connected to type bars 26 acting against a platen 27. Between the type bars 26 and the platen 27 is an inked ribbon 28, and paper 29 is fed between the ribbon and the platen. As any key or combination of keys 25 is depressed, the corresponding type bar or bars 26 are moved against the ribbon 28 to make an impression on the paper 29. The platen 27 is rotatably mounted on the machine, and a clutch 30, operatively connected to the keys 25 through suitable mechanism, rotates the platen 27 during a depression stroke of the keys, and at the end of the stroke an impression corresponding to the key being depressed is made on the paper.

As shown in Fig. 1, there are 22 keys, 21 of which represent letters of the alphabet; and, by combinations of these letters, dictation is recorded phonetically. The twenty-second key, indicated at 31 in Fig. 1, represents an asterisk, as shown.

Each of the type bars 26 has two types 34 and 34a (Figs. 12 and 18) embossed on its end. The types on the aligned type bars are arranged in an upper and lower row, with the upper row normally in operative alignment with the platen.

Directly behind the bank of keys 25 is a numeral bar 32 extending the full length of the keyboard, and this bar is operatively connected to the bank of type bars 26 so that, upon depressing the numeral bar 32, the type bars are pivoted about an axis 33 (Fig. 12) to raise the type end of the bars to bring the lower set of type 34 into operating alignment with the platen. On certain keys, the lower types are numerals, and, upon depressing these keys with the numeral bar, impressions of numbers 1-9, inclusive, are made. The bottom of the type bar actuated by key 31 is left blank, so that depressing this key together with the numeral bar 32 serves as a space key to rotate the platen and advance the paper without making any impressions.

On the top surface of the numeral bar 32 are depressions 301 in direct alignment with the top bank of keys. These depressions aid in guiding the fingers to their proper positions on the numeral bar.

Referring to Figs. 7 and 16, the machine comprises, generally, a base 36, a machine frame or chassis 37 supported on the base and secured thereto by machine screws 38, and a casing 39 enclosing the frame and fitting over the base. Legs 40 are secured to the underneath face of the base 36, and screws 41 hold the legs in place and are threaded into lugs 42 formed integrally with the casing 39. The platen 27 and the various other parts making up the machine proper are supported on the chassis 37.

SPECIFIC DETAILS OF THE MACHINE

Machine frame or chassis

The chassis 37 comprises spaced legs 43 and 44 joined together at the top near the forward end by a relatively heavy horizontal spool supporting member 45 (Fig. 5) and near the other end by a transverse member 78. The dimensions of the various members making up the chassis are kept within extremely close tolerances, and, when assembled, the chassis forms an accurate and sturdy frame for the machine.

Key lever assembly

Referring to Fig. 1, the keys 25 are secured to the end of levers generally indicated at 46, which are fulcrumed on a key lever shaft 47 journaled in the chassis at 48 and 49 respectively. Before being installed in the machine, the key levers 46 are mounted onto the shaft 47, and spacers or washers 50 on each side of each key lever are threaded onto the shaft. The shaft is threaded as shown in Fig. 6 at 51, and the spacers or washers 50 are knurled so as to make possible slight adjustments by providing means for permitting gripping of the washers.

A frame 52 (Figs. 1 and 4) is supported on the lever shaft 47 with arms 53 and 54 surrounding the shaft. Lock pawls 55 are attached to the frame 52 by machine screws 56 and engage the knurled periphery of the washers 50 to lock the washers in position after their positions on the shaft have been adjusted.

Referring to Fig. 6, a partially threaded pin 332 enters a hole 333 in ear 334 of the arm 53 of the frame 52, and this pin is held by leg 44 of the chassis. This pin holds the frame 52 in place.

The frame 52 is held in place on the shaft 47 by nuts 55' and 56', one on each side of arm 53 of the frame.

As best shown in Fig. 6, the shaft 47 is supported in the sides of the chassis at 57 and 57'. The key levers extend beyond the fulcrum point, as best shown in Fig. 4, and terminate with upwardly turned arcuate surfaces 58, each surface engaging an arm of one of the bell crank levers generally indicated at 59.

Key lever shaft 47 has a central threaded portion 51 (Fig. 6) between the sides of the chassis 43 and 44, and at each end the shaft has a smaller diameter, indicated at one end 60 of Fig. 6.

When assembling the machine, the key levers are mounted on the shaft 47 and properly spaced, and then the assembly is mounted as a unit on the chassis of the machine by raising the narrow ends of the shaft through slots 61 (Fig. 4) to their seats 62; and then a sleeve 63 (Fig. 6) is inserted at each end through the side of the chassis over each of the narrowed ends 60 of the shaft. This sleeve, being larger in diameter than the slot 61, securely holds the shaft in the sides of the chassis. A machine screw 64 is threaded into each end of the shaft 47 with a washer 65 placed between the head of the screw and a shoulder 66 on the end of the sleeve 63. When each screw 64 is drawn tight, the shoulder 66 of each sleeve 63 is brought into close contact with its corresponding side of the chassis to prevent endwise play of the key lever shaft 47.

Referring to Fig. 1, it is to be noted that key 31 is composed of two parts with an asterisk controlled by the lower portion 31' and a blank by the upper part 31", both portions being mounted on a common key lever 67. Thus, when key 31 alone is depressed, the asterisk is impressed on the paper around the platen, while if the upper portion together with the numeral bar 32 is depressed, no impression is made on the paper. Thus, the upper part serves as a space key. Heretofore, the upper portion of the key 31 was a space key mounted on a separate key lever, and the presence of this extra lever greatly complicated the problem of assembling. By combining the two parts on a common lever 67, mounting the levers on the key lever shaft 47 is greatly simplified.

*Bell crank and type bar assembly*

As previously stated, the free ends of the key levers 46 terminate in arcuate surfaces 58 (Fig.4) engaging the arms of bell crank levers 59. Referring to Figs. 4 and 6, these bell crank levers are mounted on a bell crank shaft 68 journaled in the sides 43 and 44 of the chassis. Washers 69 are inserted, one between each bell crank lever and the adjoining bell crank lever, to properly space the levers.

Referring to Fig. 6, set screws 330 and 331 are threaded through one of the legs 184' of the framing member 184 and are drawn up against the end washer 68' to take up the slack between the bell crank levers on the shaft 68.

Referring to Fig. 4, each bell crank lever has an upwardly extending arm 70 and a substantially horizontal arm 71, the latter of which has a relatively flat surface 72 for engaging the arcuate surface 58 of the corresponding key lever. At the free end of the upwardly extending arm 70 of each bell crank lever, the type bar 73 is pinned; and, as a key 25 is depressed, rotating the key lever 46 about its axis 47, the cooperating faces 72 and 58 of the bell crank lever and the key lever, respectively, transmit the thrust of the key lever through the bell crank to rotate the upwardly extending arm 70 in a counter-clockwise direction, thereby moving the type bar 73 toward the platen 27.

Referring to Fig. 7, the type bars rest on a cradle 74 having upwardly extending guides 75 between which the type bars 73 move. The cradle has horizontally extending legs 76 and 77 (Fig. 5) pivotally mounted on a cradle and type bar supporting frame 78 by machine screws 79 and 80 threaded into vertical arms 81' and 82', projecting upwardly from spaced portions 81 and 82 of frame 78, the heads of the screws serving as trunnions about which the cradle 74 pivots. The frame 78 may be pinned or otherwise properly secured to the sides 43 and 44 of the chassis.

A plate 83 extends across the tops of the type bars 73, and is screwed to the cradle at 84 and 85. The type bars move back and forth guided by cradle 74 and this plate 83.

Referring to Figs. 4 and 5, upper and lower spring racks 86 and 87 extend between the spaced portions 81 and 82 of the frame 78 and are secured to horizontal arms 81" and 82" by screws 89. Upwardly extending hooks 90 along the edges of each rack serve as attachment members for springs generally indicated at 91 between the arm 70 of the bell crank levers and the hooks 90 on the spring racks. An integral hook 92 is provided on each arm 70 of the bell crank levers for attachment of the springs 91. The hooks on adjoining levers are placed with one above the other, and the springs are staggered as shown in Fig. 4 to provide room for all the springs.

Upon the return stroke of the levers 25, after having been depressed, it is the force of the springs 91 on the upper arms of the bell cranks 70 which returns the type bars 73 to their normal positions, indicated in Fig. 4. By attaching these springs to the vertical arms of the bell cranks, substantially all backlash due to clearance between pivoted joints is taken up by the springs, thereby greatly aiding in maintaining adjustment and reducing noise in the machine. There is one spring provided for each bell crank lever, making adjustment of the key lever action very simple. It may be desirable to attach these springs directly to the type bars themselves rather than to the vertical arms of the bell crank levers.

A plate 94 fits over the top of the spring assembly and includes a downwardly extending flange 95 covering the ends of the springs. This flange is provided with ears 96 for attachment to the spring supporting frame 78. The plate 94 has downwardly projecting flanges 330 on opposite sides thereof with ears 331 for engaging the top surface of the arms 81" or 82", as the case may be.

Referring to Figs. 5 and 12, the numeral bar 32 is secured to one end of a numeral bar frame comprising a pair of spaced numeral bar levers 100 and 101, fulcrumed at 102 and 103, respectively, and joined at their free ends by a numeral bar brace 104.

Referring to Figs. 4, 7, and 12, a plate 105 is secured to the underneath side of the cradle 74 and has an outwardly extending flange 99. Between this flange and the far end of the numeral bar lever 100 is attached a link 106, adjustably secured to the lever 100 in the slot 107. Link 106 is slotted, as shown in Fig. 2, so that a screw driver may be inserted in one of the slots and twisted to change the length of the link, thereby providing quick and simple adjustment for the link. In this manner, the stroke of the numeral bar is adjusted. On depressing the numeral bar 32, the numeral bar frame pivoting about its fulcrum 102 and 103 raises the cradle 74 through the connecting link 106. By raising this cradle, the type bars swing about their pivot points 33 to bring the lower type 34 on the end of the bars into operative alignment with the platen.

A spring 98 extends between a projection from the lower plate 105 underneath the cradle 74 to a spring clip 97 extending downwardly from a transverse framing member 184 between spaced portions 81 and 82 of frame 78 and integral therewith. This spring is in tension, resiliently holding the cradle 74 in its normal operating position shown in Fig. 4.

Adjustable stop pads 108 and 109 are fastened to the upper surface of the numeral bar brace 104, and they engage the machine chassis to limit the stroke of the numeral bar.

*Universal bar assembly*

Referring to Figs. 2, 3, and 8, a universal bar frame 110 is shown comprising a pair of universal levers 111 and 112, one on each side of the machine, fulcrumed between its ends at 113. Between the forward ends of the levers, a universal bar 114 extends across the machine and is in the form of an upwardly opening channel member 115 carrying a felt cushion 116. Between the opposite ends of the universal levers 111 and 112 is a universal bar brace 117, also of channel shape, carrying a pair of adjustable pads 118 (Fig. 4) of felt or other suitable material which engage the machine chassis to limit the stroke of the universal bar. This construction of the universal bar frame makes a very rigid member which improves operating conditions and greatly increases the rigidity of the entire machine. At the rear end of the universal lever 112 is an upwardly extending projection 119 having an inclined upper surface 120.

The key levers 46 rest on the universal bar 114 so that, upon depression of a key 25 (Fig. 8) the universal bar is moved downwardly, pivoting the levers 111 and 112 about their pivot points 113 to raise the projecting portion 119 of universal lever 112.

As is best shown in Figs. 4 and 8, the key levers 46 have a raised portion 300 directly over the universal bar 114 to elevate the normal position of the universal bar and provide a maximum amount of room between the bar and the base of the machine for storage of paper.

The key levers 46 are fulcrumed to the machine chassis in such a manner that the maximum amount of vertical clearance is provided between the paper tray and the underneath side of the keys, even when the keys are depressed.

Referring to Figs. 4 and 5, a stop bar 236 extends transversely across the machine at the forward end over the key levers 25 and limits the upward movement of the keys and the numeral bar. This stop bar comprises a downwardly opening channel member 237 attached to the forward end of sides 44 and 45 of the chassis by angle members 238 and 239, screwed to the sides by machine screws 239'. Screws 240 and 241 secure the lower flanges of the angles 238 and 239, respectively, to the channel member 237 of the stop bar 236. As shown in Fig. 4, a felt block 242 is fastened inside the channel member 237, and the lower surface of this block engages the key levers 46 and the numeral bar levers 100 and 101. As shown in Fig. 4, the upper flanges of the angle members 238 and 239 are slotted at 243 so that the stop bar 236 may be moved up and down in this slot to adjust the stroke of the keys and numeral bar. The screws 239', when tightened, fix the position of the stop bar.

*Clutch and clutch drive*

Referring to Figs. 4 and 5, the platen 27 comprises an inner core 121 surrounded by a rubber covering 122. Bushings 123 (Fig. 5) are inserted in the ends, having a shoulder 124 resting against the end of the platen and outwardly extending collars 125. A platen shaft 126 passes through the bushings at each end of the platen and is journaled in the sides 44 and 45 of the machine chassis. Separate collars 127 are inserted between the bushings 123 and the chassis to prevent end play of the platen, and a set screw 128 in one of the collars 125 of the bushings 123 secures the platen to the shaft 126.

The platen shaft 126 (Figs. 5 and 10) extends through the side 43 of the chassis and projects beyond to receive the clutch 30. The clutch comprises a drum in the form of a clutch sleeve 129 (Fig. 10) surrounding the end of the platen shaft 126, a clutch lever 130, and a collar 131, both of the latter being concentrically mounted on the sleeve 129. The end of the shaft 126 is flattened along diametrically opposite sides thereof, as indicated in Figs. 9 and 10 at 132, and the sleeve 129 is adapted to fit snugly around the shaft and along the flattened edges 132. The collar 131 is rotatably mounted on the sleeve 129 with just enough clearance to permit easy rotation of the collar about the sleeve, and clutch lever 130 fits over the sleeve 129 with the diameter of the opening somewhat greater than the diameter of the sleeve. As shown in Fig. 9, a portion of the inner circumference of the lever is flattened out, as shown at 133, to provide a wedging face adapted to engage the periphery of the sleeve 129. The clutch collar and lever 131 and 130, respectively, are pinned together at 134 in some suitable manner, and at the diametrically opposite side of clutch lever 130 is a projection 135 to which is pivotally secured a short lever 136. A slot 137 is made on the inner face of the clutch collar 131 opening toward the clutch lever 130; a spring 138 is placed in the slot; one end 139 is seated at the bottom of the slot 137, and the other end rests against the lug 140 extending from the clutch lever 130 into the slot 137. A washer 141 is placed on the inside of the clutch and rests against the shoulders 142 on the platen shaft 126, formed by the flattened portions 132. The clutch is held onto the shaft by a machine screw 143 threaded in the end of the shaft, and a washer 144 is inserted between the head of the screw and the clutch.

Referring to Fig. 9, an upward force exerted on link 136 causes the clutch lever 130 to pivot about the axis 134 and wedge the flattened surface 133 tightly against the sleeve 129 so as to turn the platen shaft 126 in a clockwise direction. On the return stroke, the link 136 produces counterclockwise rotation of the lever arm 130 about its axis 134 to release the wedging action of the flattened surface 133 against sleeve 129, thereby rotating the clutch in a counter-clockwise direction without imparting motion to the platen. Spring 138 normally holds the wedging face 133 against the sleeve 129 so that the clutch is at all times in position to turn the platen in response to even the slightest downward motion of a key.

A lug 145 is placed on the upper surface of the clutch lever 130; and, when pressure is applied downwardly on this lug, the flattened wedging face 133 is moved away from the sleeve 129 to permit rotation of the platen in a counter-clockwise direction. Without this releasing lug, any motion of the platen in a counter-clockwise direction urges the wedging face 133 against the sleeve 129 to resist such motion. Thus, if for any reason the operator desires to move the paper in a reverse direction over the platen, pressure applied with the finger on lug 145 will release the clutch to permit free movement of the platen in either direction.

It may be found desirable to reduce the friction between the abutting faces of the clutch lever 130 and the collar 131, in which case spacing means may be inserted between these faces to hold them slightly apart. In this manner, any tendency for the clutch to drag during the return stroke may be eliminated.

Referring to Fig. 8, the clutch 30 is driven through a long link 146 pivoted to the chassis at one end 147 and pinned at 148 to the free end of short link 136. The long link 146 has a downwardly projecting arm 149, to which is secured a spring 150 fastened at its free end to the machine chassis at 328. Between the ends of long link 146 is a rubber disk 151 movable lengthwise of the link in a slot 152 and secured therein by a screw 153. The disk 151 is mounted on a core 154, and between the screw 153 and the link 146 is a washer 155. The spring 150 urges the clutch driving links 146 and 136 in a downward direction, so that normally they assume the position shown in Fig. 3. Upon depression of a key 25, pressure is exerted through the key lever 46 and universal bar 114 to raise the far end of the universal bar frame, causing the projection 119 of the universal lever engaging the rubber disk 151 to rotate the long clutch link 146 about the pivot point 147 in a counter-clockwise direction, thereby causing the links 146 and 136 to act as a toggle joint to exert a force in a clockwise direction on the clutch 30. During this motion, the wedging action between the flat face 133 of the clutch lever 138 and the sleeve 129 rotates the platen 27. On the return stroke of the key 25, the spring 150 pulls the links 146 and 136 back to their normal position shown in Fig. 3.

A stop 156 is placed above the rubber disk 151, and is adjustable to regulate the stroke of the toggle joint and prevent the toggle from passing dead center. By moving the disk 151 along the link 146 in the slot 152, adjustment may be made in the action of the clutch in response to depressing the key 25. The stop 156 is secured to the side 45 of the chassis by a screw 157.

Paper feed

As shown in Fig. 4, the paper 158 is fed upwardly over the paper guide plate 159 around the platen 27 and downwardly again to a paper storage compartment.

A paper guide plate 159 is pivotally mounted on the machine by a shaft 161, and extending inwardly from the plate is a spring attachment member 186. A spring 187 extends from this attachment member to a second attachment member 188 on the stationary framing member 184, and this spring is in tension resisting movement of guide plate 159 in a clockwise direction about the axis 161.

This paper guide plate presents a smooth surface over which the paper passes, and its shape is such that the paper passing from beneath and around the platen as described naturally assumes the contour of this plate, thereby increasing the smoothness in feeding the paper around the platen. No rough or sharp edges are exposed, thus avoiding interference with the paper as it is being fed through the machine.

On the back of the machine, a paper feed roll frame 160 (Fig. 4) is pivotally mounted on the shaft 161, carried by the sides 43 and 44 of the chassis, and comprises a pair of upwardly extending spaced side members 162 and 163 (Fig. 5) with a horizontally extending connecting member 164 across the top of the side members, the lower edge of which is serrated to form a paper tearing edge 188. The side members 162 and 163 at their lower ends are spaced to correspond substantially to the width of the paper, and they widen out slightly, as indicated at 327 in Figs. 4 and 7, to allow clearance for the paper leaving the platen. A feed roll shaft 165 extends between the side members 162 and 163 and is secured thereto by screws 166. A pressure feed roll 167 is mounted on the shaft 165, and extending inwardly from the connecting member 164 at each end of the feed roll 167 is a lug 168 projecting inwardly beyond the periphery of the feed roll to center it on the shaft.

As best shown in Fig. 4, springs 169 are fastened to the feed roll frame 160 above the pivot point 161, and are secured at their other ends to some part of the machine frame, as indicated at 170. These springs are in tension and constantly urge the feed roll 167 into contact with the platen 27; but, when the paper is being fed into the machine, the frame is held away from the platen. A stripper 171 extends inwardly from each side member of the feed roll frame 160 a sufficient distance to intercept the paper 158 coming down from the top of the platen should this paper tend to follow the platen around.

The feed roll 167 is corrugated circumferentially to form a plurality of ridges 172 for engaging the paper passing over the platen. By providing these sharp ridges, point contacts are made with the paper to eliminate offset printing, an undesirable characteristic of former paper feed rolls.

Endless ribbon inking device and ribbon drive

Referring to Fig. 5, the ribbon 28 is an endless ribbon passing between the type bars 73 around legs 76 and 77 of the cradle 74, and around a ribbon spool 173. Guide plates 174 and 175 are fastened to the sides of the arms 76 and 77, respectively, by machine screws 176, and these plates have backwardly extending guide arms 177 for guiding the ribbon into the passage between the type bars 73 and the platen. Additional guides 178 and 179 extend outwardly and downwardly from the sides of plate 94 (Figs. 4 and 5). Spaced outwardly from each of the guide members 177 is a vertically extending guard 180 (Figs. 5 and 13), and the ribbon passes between this guard and the guide member 177. A small guide strip 181 extends outwardly from the cradle 74 on each end fitting over the spaced guard 180, and serves to prevent climbing of the ribbon.

Each of the ribbon guiding devices on the ends of the cradle are identical, so for present purposes one only will be described. Referring to Fig. 13, the guide strip 181 has a tail-piece 324 bending downwardly and made of some suitable spring material. The strip is secured to the cradle 74 by machine screw 85 having a shoulder 325 providing space between the screw head and the cradle, and the screw, when threaded into place, bears against the upper surface of the tail-piece 324 of the strip 181, tending to straighten the tail-piece, thereby resiliently holding the strip 181 in place on the cradle 74. The guide strip 181 when in place fits in a small recess 326 located in the upper end of guard 180.

Referring again to Fig. 5, when it is desired to replace the ribbon 28, the guide strips 181 are rotated about the screws 84 or 85, as the case may be, to permit raising of the ribbon out of the guard 180 (Fig. 13) and lowering of a new one into place within the U-shaped guard 180. Strips 181 are then returned to their position, shown in Figs. 5 and 13, to cover the gap at the top of guard 180 to prevent the ribbon from climbing.

Referring to Figs. 4 and 5, the spool 173 includes a top flange 182, a bottom flange 183, and a core 185, secured to the top and bottom flanges by tongues 189 and 189' extending above and below, respectively, the core 185. Fastened to the bottom flange 183 is a ribbon spool gear 190 spaced below the lower flange 183 along the outer periphery thereof, and having a plurality of spaced slots 192 in the depressed portion 191.

The spool supporting member 45 has an upwardly extending boss 193 around which the spool 173 fits. Between this boss and the combined lower flange 183 and spool gear 191 is a collar 194 whose lower edge projects below the lowermost face of the spool gear 190 to serve as the bearing for the spool on the top surface of the member 45. The spool is held in place over the boss 193 by a thumb screw 195 threaded into the top of the boss and having a knurled head to furnish gripping means.

Around the core of the spool between the upper and lower flanges is wrapped a fabric 196 adapted to absorb ink and to impart the ink to the ribbon 28 as it comes into contact with the fabric. In the top flange 182 of the spool is a plurality of openings 197 through which ink is fed onto the fabric 196. Thus, the spool 173 serves as an inking well for constantly replenishing the ink supply on the ribbon.

Referring to Figs. 4 and 5, it is to be noted that the underneath portion of spool supporting member 45 has grooves 198 and 199 for receiving a ribbon feed shaft 200 passing the full width of the machine and journaled in legs 201 and 202 of the spool supporting frame 45 and in sides 43 and 44 of the chassis. Screws 203 and 204 thread into the opposite ends of the shaft 200; and, at one end, between the head of the screw 203 and the chassis, is a washer 205, while at the other end a rubber disk 206 is inserted between the head of the screw 204 and the side 44 of the chassis, having a core 207 forming the center of the disk. This core projects beyond the inner face of the disk 206 to provide a bearing surface 207'. Groove 199 is provided with a transverse slot 208 extending entirely through the thickness of the spool supporting member 45. In this slot, mounted on shaft 200, is a driving pinion 209 secured to the shaft by a machine screw 210. This pinion is directly below the slots 192 in the ribbon spool gear 190; and, as shown in Fig. 5, the teeth 211 of the pinion 209 project into these slots 192. The spacing of the teeth on the pinion 209 corresponds to the spacing of the slots 192 around the ribbon spool gear; and, on rotating the pinion, the spool 172 is rotated about the boss 193.

Referring to Fig. 2, extending upwardly from the universal lever 111 is an arm 212 projecting over the top of the rubber disk 206 having on its free end a downwardly extending driving pawl 213 pivoted to the arm 212 at 214. A spring 215 rests against the back of the driving pawl 213 urging the lower curved edge of the pawl against the rubber disk 206. On the outer face of the curved portion of the driving pawl is a friction surface 216 engaging the rubber disk. On the other side of the disk 206 is a drag pawl 217 curved at its lower end 218 and having a roughened surfaced 219 engaging the rubber disk 206, and the pawl is pivotally secured to the side 44 of the chassis by the screw 220. A spring 221 engages the upper end of the drag pawl 217, forcing the pawl against the disk 206.

As the universal bar frame 114 pivots in a clockwise direction about its axis 113 in response to depressing a key 25, the upwardly extending arm 212 rotates about the axis 113 in a clockwise direction to move the pawl 213 downwardly, applying a torque to the disk 206 through the roughened surface 216 of the pawl. During this motion of the disk 206, the drag pawl 217 is moved upwardly to release the friction between the roughened surface 219 and the rubber disk 206 to permit turning of the disk. Upon the return stroke of the key 25, the universal bar frame 114 returns in a counter-clockwise direction to its former position, moving the arm 212 and driving pawl 213 in a counter-clockwise direction. While traveling in this direction, the pawl pivots about its axis 214 to release the gripping action between the roughened surface 216 and the disk 206, thereby dragging the pawl over the peripheral surface of the disk, and at the same time the friction between the roughened surface 219 of the drag pawl 217 and the disk 206 rotates the drag pawl in a clockwise direction about its pivot point 220 to increase the frictional resistance of the drag pawl on the disk, thereby locking the disk and preventing counter-clockwise direction thereof.

The disk 206 is mounted on the ribbon spool shaft 200 with flattened sides of the shaft engaging complementary flattened sides of the core 207 to make a positive drive between the disk and the ribbon feed shaft. Thus, it is seen that, upon depressing a key 25, the disk 206 drives the ribbon feed shaft in a clockwise direction; and, upon the return stroke of the key, holding pawl 217 prevents rotation of the shaft in the counter-clockwise direction.

As previously pointed out, the pinion 209 fixed to the shaft 200 drives the ribbon spool 173 so that, as the disk 206 drives the shaft 200, the ribbon spool 173 is rotated in a clockwise direction.

Referring to Fig. 5, a pair of ribbon pressure rolls 222 and 223 force the ribbon 28 against the fabric on the ribbon spool 173 to provide a drive for the ribbon and to aid in the inking operation. A relatively narrow spool contacting surface 340 is embossed on the periphery of the rollers 222 and 223, as best shown in Fig. 11, to concentrate the pressure on the ribbon against the spool in the center portion of the ribbon. This concentrated pressure assures proper inking of the ribbon in the region where the type strikes. Each of these pressure rollers 222 and 223 is mounted in a ribbon roll bracket 224 comprising upper and lower flanges 225 and 226, respectively, (Fig. 11) with a connecting web 227. The bracket is pivotally mounted on the spool supporting member 45 at 228, and the roller 222 or 223, as the case may be, is rotatably mounted at the free end of the bracket, as indicated at 229.

Referring to Fig. 11, a lift pin 230 secures the roller 222 or 223 to its corresponding bracket; and, when the roller is in its operative position against the ribbon 28 around the spool 137, the pin is lifted, as shown in Fig. 11, with its lower edge resting on the top surface 231 of the supporting member 45. When it is desired to remove the ribbon 28 from the machine or perhaps lift the spool 173 away from the machine, the bracket 224 is rotated about its pivot point 228 away from the ribbon spool 173 until the pin 230 drops into a recess 232 in the supporting member, in which case the pin drops until the shoulder of the head 233 comes in contact with the top flange 225 of the bracket. When it is again desired to place the pressure roller 222 or 223 against the ribbon spool 173, the pin 230 is lifted by grasping the head 233 and raising the pin until the shoulder 234 engages the lower surface of the top flange 225 of the bracket, raising the pin out of slot 232 to permit rotation of the bracket to the operative position of the roller.

The pin 230 is flattened at diametrically opposite sides adjacent to the top thereof, as indicated at 332, and the opening in the top flange 225 of bracket 224, through which the pin passes, has corresponding straight edges cooperating with the flattened sides 350 to prevent turning of the pin.

A spring 235 acts on the bracket 224 to resiliently hold the roller 222 or 223, as the case may be, against the spool 173.

The use of the continuous ribbon lessens the cost of operation of the machine, because its initial cost is less than the reversible ribbon normally used, and its life is considerably longer. The inking well in the spool 173 constantly refreshes the ink supply on the ribbon, thereby always assuring uniformly clear impressions on the paper.

The endless ribbon may be folded to accommodate a very small space to facilitate carrying in the machine case. Since it is used in conjunction with an inking well, it may be procured dry and free from ink and installed on the machine in that condition. After installation, the ribbon mechanism may be turned by hand a few times to ink the ribbon.

It is common practice in machines of this type to employ a length of ribbon operating between two spools with a reversing mechanism. Considerable vertical space is required for the operation of this mechanism. By using the endless ribbon, a considerable reduction in machine height may be effected.

Machine frame or chassis

The machine frame or chassis is made up of four main parts, including the two sides 43 and 44, joined together at the front by the spool supporting member 45 and at the back by frame 78, pinned and screwed in place as indicated at 244 (Fig. 5). Across the back of the chassis connecting the sides is the substantial transverse member 184 (Fig. 4), also pinned and screwed in place. The chassis so constructed is extremely accurate in its dimensions between the side members, and is sturdy, so that there is no relative movement between the framing members tending to throw the machine out of adjustment. The stop bar 236 gives further rigidity to the forwardmost portion of the frame.

Type support for use when cleaning type

Referring to Figs. 5 and 18, a type supporting plate 245 is attached to the cover 94 along one edge 246. This plate has a plurality of uniformly spaced teeth 248 along its edge for receiving the type bars 73. As best shown in Fig. 18, the type bars 73 may be rotated in a clockwise direction about their pivot points and held between the teeth 248 in alignment, so that the type may be scrubbed transversely across the ends of the type bars without causing bending to throw the type out of alignment.

Machine casing

Referring to Figs. 1, 2, 3, 4, and 7, the casing 39 includes a pair of sides 249 and 250 having vertical portions 251 and 252, respectively, at the back and upper part of the machine, with outwardly bulging portions 253 and 254, respectively, curving from a point at the back of the machine (Fig. 1) to beneath the lower bank 255 of the keys, and a front side 256 curving forwardly from the terminating points of the sides to an apex directly below and in front of the four vowel keys indicated at 257.

As best shown in Figs. 2, 3, and 4, a substantially horizontal top 258 connects the upper vertical portions 251 and 252 of the sides and extends from the back of the machine to a point immediately to the rear of the numeral bar 32. A vertical partition 259 extends from this forward portion of the top 258 down behind the numeral bar.

As shown in Figs. 1 and 2, a removable plate 260, whose upper surface is flush with the upper surface of the top 258 of the machine, fits into an opening 261 (Fig. 7) to finish off the top of the machine. This plate rests along its forward edge on a pair of lugs 267 and 268 extending outwardly from the casing. On each side of the plate near the rear thereof is a pin 265 backed by a spring 335. A lug 263 extends downwardly from the casing and has a recess into which the end of pin 265 enters to hold the cover plate in place.

The plate 260, being flat and substantially flush with the top of the machine, serves as a small flat area upon which the paper feeding off the platen may be folded back for making pencil notations thereon. Upon removal of this plate 260, the ribbon and ribbon mechanism together with the type bars and their supporting plate are made accessible for cleaning and repairs.

Referring to Figs. 1 and 3, the casing 250 is provided with a circular opening 296 on the upper surface of the bulging portion 253 of sufficient diameter to admit a pencil. A pencil supporting member 297 extends horizontally from the stop bar 236 and is secured thereto by a screw 298. At the free end of the pencil supporting member 297 is a downwardly flanged seat portion 299 having the shape of a frustum of a cone into which the tapered point of the pencil fits. A pencil, then, is inserted vertically through the opening 296, point first, until the tapered point comes to rest in the seat 299. The casing 250 may be removed from the machine without any interference from the pencil supporting member 297.

The inside of the casing 39 may be covered with felt (not shown) to deaden sound; and, if further sound deadening is required, a layer of felt may be placed along the inner face of the base 36.

Referring to Fig. 16, the base 36 is cut out at 307 and 308 on each side of the machine so as to allow clearance; and, when carrying the machine, the operator places the four fingers of his hand in one or the other of these openings 307 and 308, and grasps the lower edge of the corresponding side of the casing.

When dismantling the machine, the feet 40 are removed, and screws 38, threaded into the lower flanges of the sides of the machine chassis, are removed. The base 36 as well as the casing 39 is then readily removed.

Paper tray

Extending out from the back of the casing is a paper tray 270, best shown in Figs. 3, 4, 7, and 19, which in its closed position (Fig. 3) extends from the front to the back of the machine and may be pulled out as a drawer, as indicated in Fig. 4. This tray has sides 271 and 272 (Fig. 7), a bottom 273, and a stationary end plate 274. An enlarged finish plate 275 is secured to the stationary end partition, and a knob 276 extends outwardly therefrom and provides a hand grip for opening and closing the drawer. At its forward end, the tray is provided with a hinged gate 277, shown in Figs. 3, 4, and 7, hinged along one of its vertical sides, as shown at 278 (Fig. 7).

Referring to Fig. 15, the side wall 271 of the tray has a spring fastener 279 for receiving the gate 277 in its hook-shaped end 280 when the gate is closed. To release the gate 277 for opening, the spring clip 279 is forced back. A spring 281 encircles the gate hinge 278 to hold the gate in a normally open position.

Guide members 282 and 283 are mounted on the sides 44 and 43, respectively, of the chassis, and have outwardly and downwardly extending flanges 284.

At the lower edge of the flange 284 is a finger 247 adapted to engage the upper edge of the gate 277 when the latter is in its closed position, shown in Fig. 7; and, as the paper tray is being closed, the finger starts the gate toward its open position, disengaging the spring fastener 279. The gate, once released from the action of the spring clip, is entirely opened by spring 281.

As best shown in Fig. 7, the upper side edges of the paper tray 277 are guided between the downwardly extending flanges 284 of the guide members 282 and 283 and washers 285 extending inwardly from the chassis. Guide members 282 and 283 are secured to the sides of the chassis by machine screws 286.

The paper tray has an inwardly depressed indentation 287 (Figs. 2, 7, 14, and 17) at the bottom of side 271 into which a spring fastener 288 snaps when the tray is in its closed position, thereby locking the tray so that it cannot be opened inadvertently to spill the paper, as when the machine is turned on end. The snap fastener 288 enters an opening 289 in the vertical wall 290 of the depressed portion 291 of the machine base 36. The paper tray 270 is seated in this depressed portion of the base. A rivet 292 (Fig. 14) secures the spring fastener 288 to the vertical wall 290 of the bottom.

A vertical finger slot 293 (Fig. 3) is provided in one of the sides of the paper tray to permit easy removal of the paper from the tray.

The gate 277 is held open (see Fig. 3) by the supply of paper 294 when the tray is closed; but, when the tray is in the open position (Fig. 4), the supply of fresh paper 294 is stored within the confines of the machine, and the gate 277 is closed, leaving the tray empty to receive the paper 158 as it leaves the platen. This paper is housed in the tray, as is shown at 295. The gate, then, separates the fresh stock of paper 294 from the used paper 295.

Extending upwardly from the machine base 36 are legs 302 and 303 (Figs. 2, 3, and 4), one on each side of the depressed portion 291 of the base (Fig. 7), connected across their tops by horizontal member 304 (Fig. 4) spaced from the base 36 sufficiently to permit passage of the paper tray 270 therebeneath. Extending forwardly from this horizontal member 304 is an arm 305 (Fig. 3) extending downwardly at its forward end to intercept the paper from the tray below in the event it tends to rise in the tray while it is being fed over the platen. This arm prevents the paper from interfering with the operation of the key levers.

On the bottom of the paper tray adjacent to its rear is a foot 386 (Figs. 3 and 7) suitable for resting the end of the tray on a table surface when the tray is drawn from the machine.

Referring to Fig. 4, ears 329, one on each side of the tray at the rear thereof, project inwardly for abutting against the flanges 284 to limit the extent to which the tray may be withdrawn from the casing.

Reporter attachment

When the stenographic machine is used for reporting conferences or court trials which are lengthy and require a large stock of paper, it is desirable to have an attachment which can be used in conjunction with the standard machine for supplying considerably more paper than can be normally held in the paper tray 270.

Referring to Fig. 19, a paper magazine 310, storing a relatively large stock of paper 311, may be attached to the underneath portion of the machine and so placed that the paper is fed up through a slot 312 in the base 36 around the platen 27, and then into the standard paper tray 270. Slot 312 is of sufficient size to receive the paper 311, and is opened so as to permit passage of paper therethrough when the standard tray 270 is drawn out of the machine as shown.

The paper magazine 310 may have a bottom 313, a pair of spaced sides 314 and 315, and a back 316. The sides 314 and 315 extend beyond the forward end of the magazine and are provided with a straight edge 317, which, when the magazine is properly placed under the machine, is substantially vertical, and an edge 318 at right angles with the previous edge 317 adapted to fit along the base of the machine. Each of the sides 314 and 315 is provided with a hook 319. A pair of lugs 320 and 321 extend outwardly on each side of the base of the machine at its central depressed portion 291, and the extended portion of each of the sides 314 and 315 fits between these lugs with hook 319 passing over lug 321, and straight edge 317 engaging lug 320. When the magazine is in place, it is held by lug 321 together with the cooperation of straight edge 318 against the bottom of the machine. Lug 320 holds the magazine in position.

As shown in Fig. 19, the magazine is held at an angle with respect to the machine and below the tray 270 so that it is out of the way of the operator, yet accessible.

As indicated in dotted lines, a tripod 322 may be employed to support the machine, in which case an arm 323 may extend rearwardly and engage the lower surfaces of the paper magazine 320 to support it in the inclined position.

As shown in Fig. 7, the height of the feet 40 provides ample room beneath the lower edge of the sides 36 for the operator to place his hand to grasp the machine for carrying.

As previously stated, a very definite attempt has been made to lighten the weight of this machine. Such materials as aluminum, Dow metal, and the like may be used in the casing and throughout various parts of the machine proper.

I claim:

1. In a stenographic machine of the class described, a frame, a threaded key lever shaft mounted on the frame, a plurality of key levers on the shaft, and spacers threaded onto the shaft with one spacer between each pair of key levers for adjusting the clearance between the spacers and the levers.

2. In a stenographic machine of the class described, a frame, a key lever shaft mounted on the frame, a plurality of key levers on the shaft, spacers on the shaft one between each pair of adjoining key levers, and means cooperating independently with each spacer for making each spacer rigid on the shaft so as to prevent movement of the spacer in a direction longitudinal of the shaft in response to a linear force applied parallel to the shaft, said last named means permitting adjustment of each spacer on the shaft independently of any other spacer.

3. In a stenographic machine of the class described, a frame, a key lever shaft mounted on the frame, a plurality of key levers on the shaft, spacers adjustably mounted on the shaft one between each pair of adjoining key levers, and means for holding the spacers in fixed position longitudinally of the shaft after adjustment irrespective of the relative positions of the spacers on the shaft, said last named means being adapted to permit movement of each spacer without affecting the other spacers.

4. In a stenographic machine of the class described, a machine chassis including a pair of vertical sides each having a slot therein extending upwardly from the lower edge thereof, said slot being of substantially uniform width for a portion of its length and of greater width at the top thereof, a key lever shaft carried by the chassis, each end of which fits into the slot in the corresponding side of the chassis, means cooperating with the slot at its enlarged portion for holding the shaft in the slot, and a plurality of key levers fulcrumed on the shaft.

5. In a stenographic machine of the class described, a machine chassis including a pair of vertical sides each having a slot therein open on one end, a key lever shaft carried by the chassis, the slot in each side of the machine chassis having a constricted portion adjacent to the open end thereof, each end of the key lever shaft being adapted to pass into the slot in the corresponding side of the machine chassis through the constricted portion of said slot, a bushing adapted to fit over each end of the shaft and in the corresponding slot but having a diameter greater than the width of the constricted portion of the slot so as to lock the shaft in the slot, and a plurality of key levers on the shaft.

6. The combination of a shaft, a pair of key levers pivotally mounted on the shaft, positioning elements between and on the opposite sides of said key levers, and means cooperating with the respective positioning elements for adjustably fixing each positioning element against movement in a longitudinal direction with respect to the shaft, said means for each positioning element being independent of the corresponding means for the other positioning elements.

7. In a stenographic machine of the class described, a machine chassis including a pair of horizontally spaced vertical sides, each having therein a slot open at one end, said slot being constricted adjacent to its open end, a key lever shaft carried by the chassis between the said sides, each end of the shaft fitting into the slot in the corresponding side of the chassis and being adapted to pass through the constricted portion of the slot, means cooperating with the slot at its non-constricted portion for holding the shaft in the slot, and a plurality of key levers fulcrumed on the shaft.

8. In a stenographic machine of the class described, a machine chassis including a pair of horizontally spaced vertical sides, each having therein a slot open at one end, said slot being constricted adjacent to its open end, a key lever shaft carried by the chassis between the said sides, each end of the shaft fitting into the slot in the corresponding side of the chassis and being adapted to pass through the constricted portion of the slot, a bushing surrounding each end of the shaft and fitting into the non-constricted portion of the corresponding slot for holding the shaft in the slot, and a plurality of key levers fulcrumed on the shaft.

9. In a stenographic machine of the class described, a horizontal shaft, a pair of horizontally spaced supports for the shaft, a slot in at least one support, said slot being open at one end and having a constricted portion adjacent to its opening, the shaft extending between said supports, one end of said shaft fitting into the slot in the support, means cooperating with the slot at its non-constricted portion for holding said end of the shaft in the slot, means for holding the other end of the shaft on the other support, and a plurality of key levers fulcrumed on the shaft.

JOHN G. STERLING.